B. C. MYERS.
MACHINE FOR BUNCHING HAY.
APPLICATION FILED JAN. 28, 1916.
1,212,094.
Patented Jan. 9, 1917.
3 SHEETS—SHEET 2
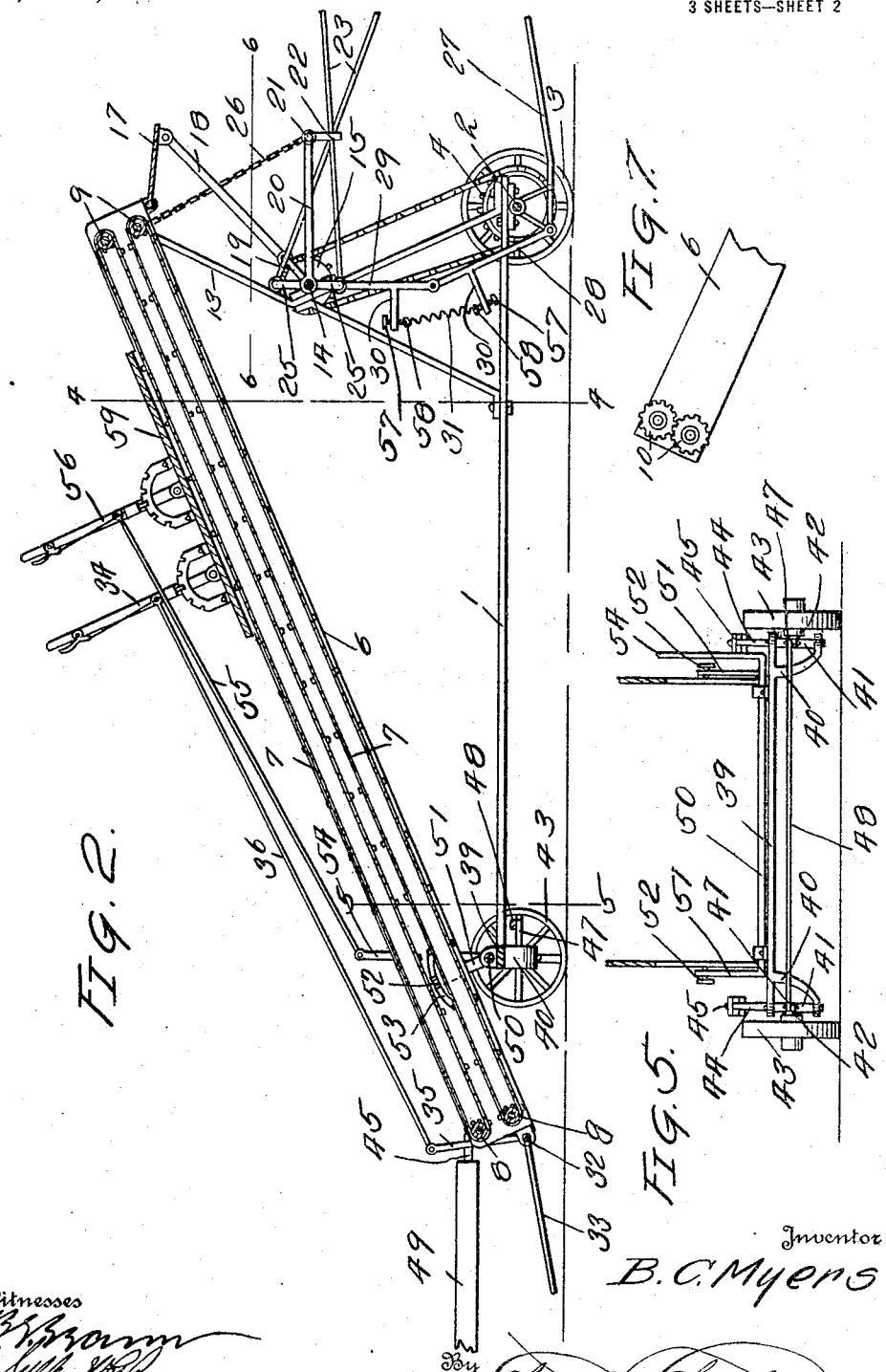
Witnesses
Inventor
B. C. Myers
By
Attorneys B. C. MYERS.
MACHINE FOR BUNCHING HAY.
APPLICATION FILED JAN. 28, 1916.
1,212,094.
Patented Jan. 9, 1917.
3 SHEETS—SHEET 3
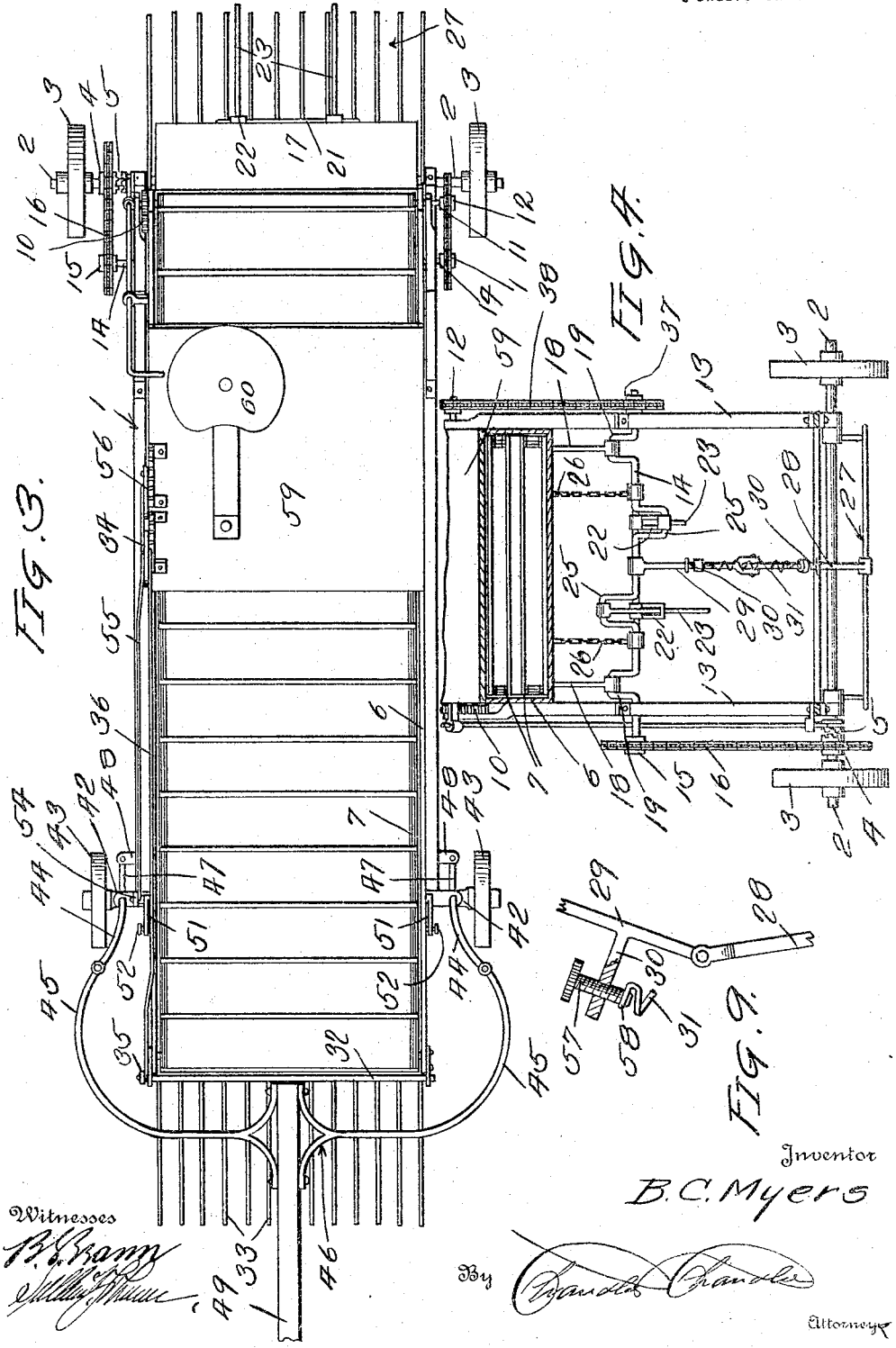
Witnesses
Inventor
B. C. Myers
By
Attorneys

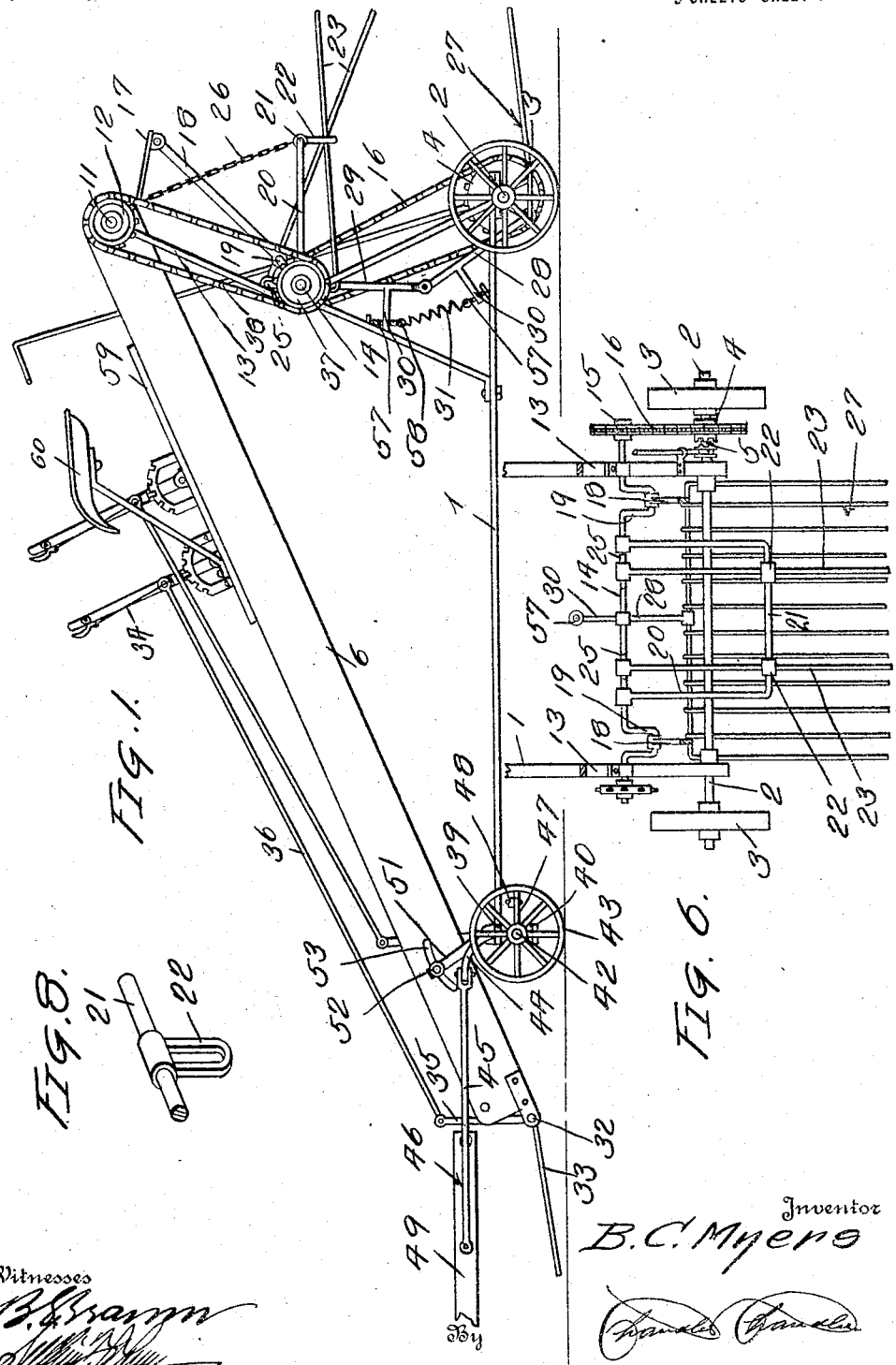

UNITED STATES PATENT OFFICE.

BERT C. MYERS, OF SAGINAW, OREGON.

MACHINE FOR BUNCHING HAY.

1,212,094.  Specification of Letters Patent.  Patented Jan. 9, 1917.

Application filed January 28, 1916. Serial No. 74,912.

*To all whom it may concern:*

Be it known that I, BERT C. MYERS, a citizen of the United States, residing at Saginaw, in the county of Lane, State of Oregon, have invented certain new and useful Improvements in Machines for Bunching Hay; and I do hereby declare the following to be a full, clear, and exact description of the invention, such as will enable others skilled in the art to which it appertains to make and use the same.

The present invention is directed to improvements in machines for bunching or shocking hay, and has for its object to so construct a machine of this character that the same will gather the cut hay and convey it to the bunching or shocking mechanism while the machine is in motion.

A further object of the invention is to provide novel means for equally distributing the hay on the cradle, and further to provide means for packing the hay on the cradle.

A still further object of the invention is to provide a cradle so constructed that it will dump automatically to discharge the hay therefrom upon receiving a predetermined amount.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a longitudinal sectional view of the device. Fig. 3 is a top plan view. Fig. 4 is a sectional view on line 4—4 of Fig. 2. Fig. 5 is a sectional view on line 5—5 of Fig. 2. Fig. 6 is a sectional view on line 6—6 of Fig. 2. Fig. 7 is a detail view of the conveyer gears. Fig. 8 is a detail perspective view of one of the finger guides. Fig. 9 is a detail view of the spring tightener.

Referring to the drawing 1 indicates a frame which has journaled transversely thereof, and adjacent the rear end an axle 2, said axle having mounted thereon ground wheels 3. Mounted on one end of the axle 2 is a sprocket wheel 4 and a clutch device 5.

Supported on the frame 1, and in inclined relation thereto is a frame 6, said frame serving to support the endless conveyers 7, which are trained around the rollers 8 and 9, the latter being provided with intermeshing gears 10, whereby said conveyers will travel simultaneously and in the same direction. The upper roller 9 has fixed to its spindle 11 a sprocket wheel 12, the purpose of which will appear later.

Journaled in the inclined supporting bars 13 is a crank shaft 14, one end of which has fixed thereto a sprocket wheel 15, said wheel being connected to the sprocket wheel 4 by a chain 16 so that movement may be imparted to the crank shaft when the machine is in motion.

Hingedly connected to the rear end of the frame 6 is a table 17, said table having pivotally connected to its forward corners the upper ends of the links 18, the lower ends of said links being connected to the crank portions 19 of the shaft 14, whereby when the shaft 14 is rotated oscillatory movement will be imparted to the table.

A yoke 20 is provided and has the inner ends of its arms rotatably engaged by the shaft 14, while the bar 21 of said yoke is provided with guides 22 for slidably receiving the fingers 23, said fingers having their inner ends pivotally engaged with the crank portions 25 of the shaft 14, said portions being oppositely disposed, whereby when the shaft 14 is rotated the fingers 23 will swing upwardly and downwardly. To hold the yoke 20 in its proper position chains 26 are provided and have their upper ends fixed to the rear end of the frame 6 and their lower ends fixed to the side bars of said yoke.

A cradle 27 is pivotally connected to the rear end of the frame 1 and has pivotally connected to its rear end a link 28, said link having its upper end pivotally connected to the lower end of the link 29, the upper end of which is pivotally engaged with the crank shaft 14. The links 28 and 29 are provided with arms 30, said arms being connected by a coil spring 31 which serves to hold said links in angular relation, said spring being of such strength as to hold the cradle 27 in a horizontal position until a certain quantity of hay has been deposited on the cradle, whereupon the weight thereof will tilt the cradle so as to discharge the hay therefrom, and at which time the spring will be expanded, but as soon as the load leaves the cradle, the spring will retract, thus returning the cradle to its normal position.

Pivotally connected to the forward end of the frame 6 is a bar 32, said bar having rake teeth 33 carried thereby, said teeth serving to gather the hay as the machine moves forwardly so as to feed the same to the conveyers 7. The teeth 33 may be adjusted upon operating the hand lever 34 which is connected to the arm 35 carried by one end of the bar 32, by a link 36.

Thus it will be seen that as the hay leaves the conveyers that it will be deposited on the table 17, which being vibrated, the hay will be shaken therefrom, and as it falls toward the cradle, the fingers 23 will on their upward movement penetrate the hay so as to force the same downwardly as the fingers swing downwardly. This operation continues until the hay has been packed upon the cradle 27 and the weight thereof overcomes the tension of the spring 31, whereupon the cradle will be rocked so as to discharge the hay collected thereon.

Fixed to the other end of the shaft 14 is a sprocket wheel 37, which is connected with the sprocket wheel 11 by a chain 38. Thus it will be seen that power to drive the conveyers 7 is derived from the shaft 14.

The bar 39 of the frame 1 is forked as at 40, for supporting the knuckles 41 having the spindles 42 for rotatably engaging the wheels 43, which support the forward end of the frame 1. The upper ends of the knuckles 41 are provided with forwardly and outwardly curved arms 44 to which are connected the arms 45 of the tongue frame 46. The knuckles are further provided with rearwardly directed arms 47 which are pivotally connected by a bar 48 which serves to turn the wheels 43 in unison, and simultaneously with the swinging of the tongue 49.

Mounted for rocking movement on the bar 39 is a shaft 50, which is provided with arms 51, the upper ends of which are provided with pins 52 for slidably engaging the slots 53 formed in the sides of the frame 6. One end of the shaft 50 terminates in an arm 54 to which is pivotally connected the forward end of the link 55, the rear end of which is similarly connected to the hand lever 56 associated with the frame 6. Upon shifting of the lever 56 the shaft 50 will be rocked and since the pins 52 of the arms 51 slide in the slots it is obvious that the forward end of the frame may be raised or lowered as desired.

The tension of the spring 31 can be regulated upon manipulating the adjusting screws 57, the same being provided with swiveled heads 58, as shown in Fig. 9 of the drawing.

Mounted on the frame 6 is a platform 59, and upon which is supported the driver's seat 60.

It will be further noted that the upper ends of the bars 13 rotatably engage the spindles 11 of the lowermost roller 9, and form in effect a hinged connection, whereby the frame 6 can swing when the lower end thereof is raised or lowered.

When the machine is used as a shocker, the spring 31 is adjusted so as to be under greater tension than when the machine is used for bunching hay.

What is claimed is:—

1. A machine of the class described comprising a wheeled supported frame, a conveyer frame mounted thereon, a crank shaft arranged between the frames, a yoke supported by the crank shaft, guides carried by the yoke, rake teeth for gathering hay and directing the same to the conveyer frame, a cradle pivotally connected to the rear end of the first named frame, fingers associated with the crank shaft and slidable in said guides, said fingers serving when oscillating upon movement of the crank shaft to pack the hay on the cradle, and yieldable means to permit the cradle to tilt to discharge the hay therefrom when the weight of the hay has reached a predetermined amount.

2. A machine of the class described comprising a frame, a conveyer associated with the frame, a cradle pivotally connected to the frame, a table hingedly associated with the conveyer and above the cradle, fingers associated with the cradle, means for simultaneously vibrating the table and oscillating the fingers, and means for permitting the cradle to rock when a predetermined amount of hay has been deposited thereon and packed by the fingers.

3. A machine of the class described comprising a wheeled supported frame, a second frame supported thereby, a crank shaft arranged between the frames, a conveyer supported by the second named frame, a table hingedly connected to the rear end of the second named frame, a yoke associated with the crank shaft and having guides carried thereby, fingers engaged in the guides and having their inner ends connected to the crank shaft, links connecting the crank shaft and table, whereby when the crank shaft is rotated the table will be vibrated and the fingers oscillated, a cradle hingedly connected to the first named frame for receiving hay from the table, said fingers being adapted to engage the hay as it falls from the table to the cradle to pack the same upon the cradle, and means rendered operative by the weight of the hay on the cradle to tilt the cradle to discharge the hay.

In testimony whereof, I affix my signature, in the presence of two witnesses.

BERT C. MYERS.

Witnesses:
T. C. WHEELER,
HERBERT EAKIN.

Copies of this patent may be obtained for five cents each, by addressing the "Commissioner of Patents, Washington, D. C."